（12）United States Patent
Haulick et al.

(10) Patent No.: US 8,705,753 B2
(45) Date of Patent: Apr. 22, 2014

(54) SYSTEM FOR PROCESSING SOUND SIGNALS IN A VEHICLE MULTIMEDIA SYSTEM

(75) Inventors: Tim Haulick, Blaubeuren (DE); Viola Hoff, Ulm (DE); Gerhard Schmidt, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1123 days.

(21) Appl. No.: 12/174,595

(22) Filed: Jul. 16, 2008

(65) Prior Publication Data

US 2009/0022330 A1 Jan. 22, 2009

(30) Foreign Application Priority Data

Jul. 16, 2007 (EP) .................................. 07013893

(51) Int. Cl.
*H03G 3/24* (2006.01)

(52) U.S. Cl.
USPC .............. 381/57; 381/73.1; 381/86; 381/71.4

(58) Field of Classification Search
USPC .............. 381/57, 73.1, 86, 120, 318, 317, 93, 381/302, 71.1–71.5; 379/406.6
See application file for complete search history.

(56) References Cited

U.S. PATENT DOCUMENTS

| 6,249,720 | B1 * | 6/2001 | Kubota et al. ..................... 701/1 |
| 6,674,865 | B1 | 1/2004 | Venkatesh et al. |
| 6,748,086 | B1 | 6/2004 | Venkatesh et al. |
| 6,895,095 | B1 | 5/2005 | Thomas |
| 2007/0053524 | A1 * | 3/2007 | Haulick et al. .................. 381/92 |

FOREIGN PATENT DOCUMENTS

EP 0788089 A1 8/1997

OTHER PUBLICATIONS

Hänsler, et al.; Acoustic Echo and Noise Control—A Practical Approach; John Wiley & Sons, Hoboken, New Jersey, USA, 2004.
Griffiths, Lloyd J.; An Alternative Approach to Linearly Constrained Adaptive Beamforming; IEEE Transactions on Antennas and Propagation; Jan. 1982; vol. AP-30, No. 1; pp. 27-34.
Haykin, S.: Normalized Least-Mean-Square Adaptive Filter; vol. 4, Prentice Hall, Englewood Cliffs, New Jersey, 2002; pp. 320-324.

* cited by examiner

*Primary Examiner* — David Vu
*Assistant Examiner* — Jonathan Han
(74) *Attorney, Agent, or Firm* — Daly, Crowley, Mofford & Durkee, LLP

(57) ABSTRACT

The present invention relates to a method for processing sound signals in a vehicle multimedia system. A sound signal is recorded by a microphone. A voice signal component resulting from reproducing a voice signal and an audio signal component resulting from reproducing an audio signal are compensated in the recorded sound signal. The invention further relates to a system for processing sound signals and a vehicle multimedia system.

30 Claims, 5 Drawing Sheets

SYSTEM FOR PROCESSING SOUND SIGNALS IN A VEHICLE MULTIMEDIA SYSTEM

RELATED APPLICATIONS

This application claims priority of European Patent Application Serial Number 07 013 893.8, filed on Jul. 16, 2007, titled METHOD AND SYSTEM FOR PROCESSING SOUND SIGNALS IN A VEHICLE MULTIMEDIA SYSTEM, which application is incorporated in its entirety by reference in this application.

BACKGROUND OF THE INVENTION

1. Field of the Invention

This invention relates to a method and system for processing sound signals in a vehicle multimedia system.

2. Related Art

Modern vehicle multimedia systems often comprise vehicle interior communication (intercom) systems, which can improve the communication between passengers, especially when high background noise levels are present. Particularly, it is important to provide means for improving the communication between passengers in the backseat and the front seat of the vehicle, since the direction of speech produced by a front passenger is opposite to the direction in which the passenger in the rear seat is located. To improve the communication, speech produced by a passenger is recorded with one or more microphones and reproduced by loudspeakers that are located in close proximity to the listening passengers. As a consequence, sound emitted by the loudspeakers may be detected by the microphones, leading to reverb/echo or feedback. The loudspeakers may also be used to reproduce audio signals from an audio source, such as a radio, a CD player, a navigation system and the like. Again, these audio signal components are detected by the microphone and are put out by the loudspeakers, again leading to reverb or feedback. Furthermore, the background noise level inside the vehicle constantly changes. In city traffic, the background noise level will be very different when the vehicle is standing, e.g., in front of a red traffic light, or when the vehicle is driving at moderate speed. At high vehicle speeds the change in background noise is even higher, for example when accelerating from 70 km/h to 130 km/h. To maintain intervehicle communication or to obtain audible sound from the multimedia system, the vehicle passengers have to continuously adjust the volume/amplification of the multimedia system. Adjustment of the volume can distract the driver and can lead to dangerous situations.

Furthermore, the vehicle passengers may want to be entertained during their journey. For this purpose, a karaoke system can be provided inside the vehicle. Such a karaoke system suffers from the same drawbacks as a vehicle intercom system, meaning that the reproduction of the voice from a singing passenger is prone to reverb and feedback. The volume of the sound output of the karaoke system also needs to be constantly adjusted by the passengers, depending on the background noise level inside the passenger compartment.

In the art, systems are known that use several microphones to record a voice signal produced by a speaking passenger. The detected sound signals are then processed for beamforming to obtain a directional sound signal in which sound originating from a direction other than a preferred direction is attenuated. The preferred direction is generally the direction in which the speaking passenger is located. That way sound originating from other directions like sound emitted from a loudspeaker is attenuated in the beam formed detected signal, whereby reverberation and feedback is reduced. Furthermore, background noise originating from directions other than the speaking passenger direction is attenuated by the beam former. Such beamforming systems are known from L. J. Griffiths, C. W. Jim: "An Alternative Approach to Linearly Constrained Adaptive Beamforming", IEEE Transactions on Antennas and Propagation, Vol. AP-30, No. 1, pages 24-34, January 1982.

To cancel echoes and remove reverberation in recorded sound signals, adaptive filters are known in the art. If music is played back in the passenger compartment while the voice of the passenger is recorded, the components in the recorded signal resulting from a music playback may be attenuated using such an adaptive filter. Adaptive filters and algorithms for filter adaption are described in E. Häusler, G. Schmidt: "Acoustic Echo and Noise Control—A Practical Approach", John Wiley & Sons, Hoboken, N.J., USA, 2004. The components from music playback are removed from the recorded signal by generating a compensation signal, which requires a signal from the music source as a reference signal. The compensation signal is then subtracted from the recorded signal. Such a system is described in the U.S. Pat. No. 6,895,095. The compensation of interfering components in the recorded sound signal is performed in the frequency domain, which requires extensive signal processing leading to delay. Delay is a major disadvantage in vehicle intercom systems or karaoke systems, since direct sound signals from the speaking/singing passenger and the sound from the intercom/karaoke system arrive at different times at the listening passengers leading to incomprehensibility. Furthermore, the system does not compensate for interfering signals for which no source signal is available. Furthermore, filter adaption in those systems is a problem for highly correlated sound signals such as voice signals. Present filtering techniques can therefore not provide a high quality sound signal that has been compensated for audio components and reverb/echo that has little time delay and can be utilized in vehicle intercom and karaoke systems.

Accordingly, a need exists for improved sound output of vehicle multimedia systems, and in particular, improved sound output to remove reverberation and feedback from detected sound signals while ensuring a good audibility of the sound output even at different background noise levels.

SUMMARY

A method for processing sound signals with a vehicle multimedia system where the sound signals are detected with a microphone. The detected sound signals may have a first voice signal component that corresponds to a voice signal generated by a person, a second voice signal component that results from a loudspeaker, and an audio signal component corresponding to an audio signal. An impulse response is estimated between the loudspeaker and the microphone that is then used to simulate the audio signal component and the second voice signal component. The simulated components are then removed from the sound signal resulting in a compensated signal that is then adjusted based upon the background noise level.

A system for sound signal processing in a vehicle multimedia system may have at least one loudspeaker that is able to reproduce an audio signal from an audio source and a processed voice signal and at least one microphone for detection of a sound signal. The sound signal may include a first voice signal component that corresponds to a voice signal, a second voice signal component that corresponds to the reproduced processed voice signal, and an audio signal component corresponding to the reproduced audio signal. The system also may include an estimator that estimates an impulse response between the loudspeaker used to reproduce the audio signal and the microphone and a first processing unit that compensates for the audio signal component in the detected sound signal where a first error signal is obtained with a first filter using the impulse response as filter coefficients. A second processing unit that compensates for the second voice signal component in the detected sound signal where a second error signal is obtained with a second filter using the same impulse response as filter coefficients. The system also includes a processor that estimates a background noise level based on the second error signal; and a controller that controls the amplification of the second error signal based on the background noise level.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
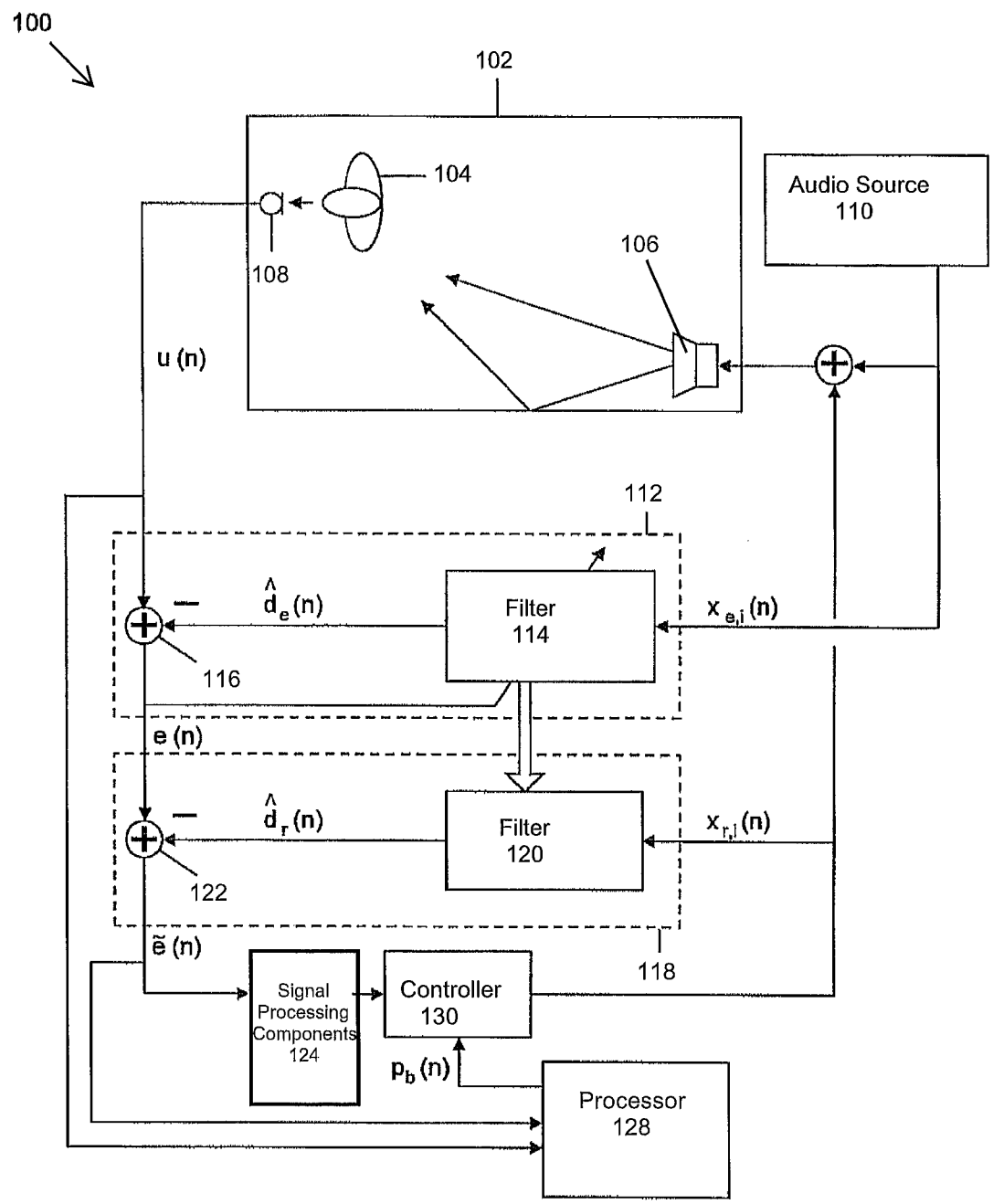
FIG. 1 is a schematic diagram of one example of an implementation of a system for processing sound signals in a vehicle multimedia system.

FIG. 1 represents a vehicle multimedia system 100 for processing sound signals in a vehicle multimedia system. A vehicle passenger compartment 102, in which a passenger 104 is located, comprises a loudspeaker 106 and a microphone 108. An utterance by the passenger 104 is recorded by the microphone 108 and reproduced by the loudspeaker 106. Loudspeaker 106 furthermore reproduces an audio signal $x_{e,i}(n)$ of an audio source 110. As the audio source file may include multiple audio channels, the index i is introduced representing the audio channel (e.g., i equals 0, 1 for a stereo signal). The variable n refers to the time. The reproduced audio and voice signals are also recorded by the microphone 108. Thus, a sound signal u(n) detected by the microphone 108 includes a first voice signal component from the passenger 104, a second voice signal component from reproducing the passenger voice by the loudspeaker 106, and an audio signal 106, component from reproducing the audio signal of the audio source 110 by the loudspeaker 106. The detected sound signal u(n) is then processed by first processing unit 112 to compensate the audio signal component in u(n). The signal paths of the audio signal from the loudspeaker 106 to the microphone 108 can be described by an impulse response $h_i$. Estimating that impulse response is provided by the first processing unit 112. The first processing unit 112 includes a first adaptive filter 114, using the audio signal $x_{e,i}(n)$ from the audio source 110 as an input. The estimation of the impulse response and the compensation of the audio signal component will be described in further detail below.

The impulse response is estimated by an adaption process. The first adaptive filter 114 simulates the audio signal component by a convolution of the audio signal $x_{e,i}(n)$ and the estimated impulse response $\hat{h}_i$, resulting in a simulated audio signal component $\hat{d}_e(n)$.

The audio signal component is simulated in the sense that the filter, using the convolution of the impulse response with the audio signal, basically simulates the propagation of the audio signal through the vehicle cabin passenger compartment (or cabin) 102. The 'simulated' audio signal component obtained from the filter substantially corresponds to the audio signal reproduced by the loudspeaker 106, propagated through the cabin and recorded by the microphone 108 (audio signal component), when using the appropriate impulse response. The process may also be referred to as an estimation of the audio signal component, resulting in an estimated audio signal component.

The simulated or estimated component is subtracted by a first subtraction unit 116 from the detected sound signal u(n), where a first error signal e(n) is obtained:

$$e(n) = u(n) - \sum_{i=0}^{M-1} \hat{d}_{e,i}(n) = u(n) - \sum_{i=0}^{M-1} \hat{h}_i^T(n) x_{e,i}(n) \tag{1}$$

The summation here is performed over the audio channels, the parameter M denotes the number of channels. The vector $x_{e,i}(n)$ denotes the vector of the last N audio signals:

$$x_{e,i}(n) = [x_{e,i}(n), x_{e,i}(n-1), \ldots, x_{e,i}(n-N+1)]^T \tag{2}$$

The estimated impulse responses $\hat{h}_i(n)$ are subsequently adapted in the direction of a negative gradient of a suitably chosen cost function J(e(n)):

$$\hat{h}_i(n+1) = \hat{h}_i(n) - \mu_i(n) \nabla_{\hat{h}_i} J(e(n)) \tag{3}$$

The step size factor $\mu_i(n)$ is an important parameter for controlling the adaption. If the vehicle multimedia system is, for example, utilized as a karaoke system, it is generally known at which time a passenger will start to sing. This knowledge may be used to decrease the step size factor before the singing starts to enable a better adaption. Further information about controlling the step size can be found in E. Häusler, G. Schmidt: "Acoustic Echo and Noise Control—A Practical Approach", Johln Wiley & Sons, Hoboken, N.J., USA, 2004, the test of which is incorporated in this application by reference. For adaption of the estimated impulse responses minimizing the mean square error $$J(e(n)) = E\{e^2(n)\} \tag{4}$$

is a suitable method.

In this equation E denotes the expectation value. In this case the adaption of the impulse responses can occur as follows:

$$\hat{h}_i(n+1) = \hat{h}_i(n) + \mu_i(n) \frac{e_i(n)x_{e,i}(n)}{\sum_{i=0}^{M-1} x_{e,i}^T(n)x_{e,i}(n)} \qquad (5)$$

It should be noted that in the case of multiple channels an extended normalization has to be performed. Details of such normalization can be found in S. Haykin: "Adaptive Filter Theory", Vol. 4, Prentice Hall, Englewood Cliffs, N.J., 2002, the text of which is incorporated in this application by reference. Additionally, methods to increase the speed of conversion may be utilized, for example, fixed or adaptive decorrelation filters. The adaption of the impulse response may also be implemented in the frequency or sub-band domain, yet the convolution should occur in the time domain to avoid delay.

After compensation of the audio signal component, the second voice signal component that is still present in the first error signal is compensated by a second processing unit 118. The second processing unit 118 comprises a second filter 120 using the estimated impulse response $\hat{h}_i(n)$ as filter coefficients. The second filter 120 uses the processed voice signal $x_{r,i}(n)$ as an input. The vector $$x_{r,i}(n)=[x_{r,i}(n),x_{r,i}(n-1),\ldots,x_{r,i}(n-N+1)]^T \qquad (6)$$

contains the last N processed voice signals. The simulated second voice signal component is then obtained by multiplying the impulse response vector with the vector of the last processed voice signals, which corresponds to a discrete convolution:

$$\check{d}_{r,i}(n)=\hat{h}_i^T(n)x_{r,i}(n) \qquad (7)$$

As mentioned before, an impulse response is calculated for each of the M audio channels, and a simulated second voice signal component is obtained accordingly for each channel. The sum of the simulated second voice signal components can then be subtracted from the first error signal e(n) by a second subtracting unit 122 to obtain the second error signal ẽ(n). Note that only one audio channel is shown in FIG. 1. The transfer of the estimated impulse response from the first filter 114 to the second filter 120 is illustrated by an arrow. Instead of transferring the estimated impulse response, both filters 114, 120 may simply access the same memory in which the impulse response is stored. In summary, the audio- and echo-compensated sound signal in form of the second error signal is obtained from the detected microphone signal by the following subtraction:

$$\tilde{e}(n) = u(n) - \sum_{i=0}^{M-1} d_{e,i}(n) - \sum_{i=0}^{M-1} d_{r,i}(n). \qquad (8)$$

The second error signal ẽ(n) is then processed by signal processing components 124. The components 124 are optional and may comprise noise reduction, equalizers, limiters, automatic gain control and the like. The processed voice signal $x_{r,i}(n)$ is obtained by splitting the second error signal in M channels corresponding to the M audio channels and amplifying said channels with the same or individual amplification factors. Splitting may occur in the processing components or in the controller 130. The processed voice signal is then reproduced by loudspeaker 106. One has to note that generally audio signals are reproduced by the front as well as the back speakers in a multichannel multimedia system, whereas the processed voice signal is only reproduced by the loudspeakers close to the listening passengers. This is not accounted for in equation 8. This is still considered by the method, as the output of the processed voice signal is a priori set to 0 for the channels corresponding to the loudspeaker 106.

The vehicle multimedia system 100 further includes processor 128 for estimating a background noise level. The processor 128 therefore includes functionality to estimate a short-time power of the detected sound signal $p_u(n)$ and for determining a short-time power of the audio- and echo-compensated signal $p_{\tilde{e}}(n)$ (or second error signal). The short-time power may be determined by recursive filtering of the squares of the respective signal:

$$p_u(n)=\lambda p_u(n-1)+(1-\lambda)u^2(n) \qquad (9)$$

$$p_{\tilde{e}}(n)=\lambda p_{\tilde{e}}(n-1)+(1-\lambda)\tilde{e}^2(n) \qquad (10)$$

The time constant $\lambda$ of the IIR filtering may be chosen from the range of values $\lambda \in [0.95, 0.999]$.

The background noise level $p_b(n)$ is then estimated as follows:

$$p_b(n)=\min\{p_b(n-1),p_u(n),p_{\tilde{e}}(n)\}(1+\epsilon(n)) \qquad (11)$$

The time-dependent factor $\epsilon(n)$ takes on the following values:

$$\varepsilon(n) = \begin{cases} \varepsilon_0, \text{ if } p_{x_e}(n) > p_0 \\ \varepsilon_1, \text{otherwise} \end{cases} \qquad (12)$$

The constants $\epsilon_0$ and $\epsilon_1$ are chosen slightly larger than 0, where $$\epsilon_0 < \epsilon_1. \qquad (13)$$

$p_{x_e}(n)$ is the short-time power of the audio signals, averaged over time and the number of channels M. It can be calculated as follows:

$$p_{x_e}(n) = \lambda p_{x_e}(n-1) + (1-\lambda)\frac{1}{M}\sum_{i=0}^{M-1} x_{e,i}^2(n) \qquad (14)$$

Figure 2:
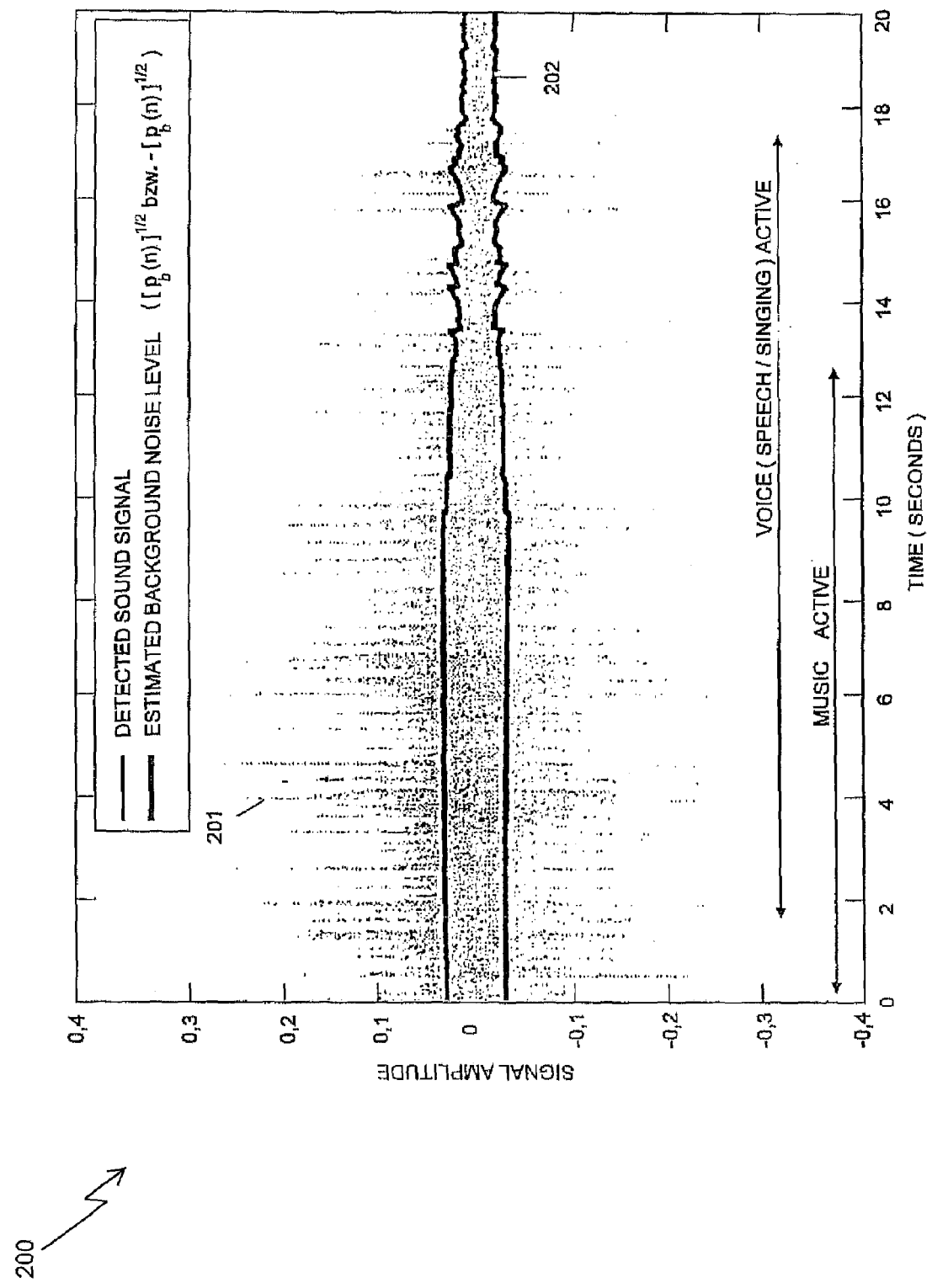
FIG. 2 is a table illustrating a directional detected sound signal and an estimated background noise level.

The constant $p_0$ is chosen so that by comparing it with the average music short-time power it can be determined whether music playback is active. Accordingly, if music playback is active, the estimation of the background noise level is more slowly adapted. An estimated background noise level together with a detected sound signal u(n) is shown in the table 200 of FIG. 2. The detected sound signal 201 shows a plurality of peaks during times when both music and voice are active, whereas it shows fewer peaks when only the voice is active, and almost no peaks are visible without any music or voice activity. The estimated background noise level is shown as reference sign 202 (bold line). Naturally, the background noise estimation is most accurate when no audio or voice components are present, yet is still achieves good accuracy for the other situations. Although only one microphone 104 and audio channel is shown in FIG. 1, microphones may be provided for each passenger position, and accordingly, background noise levels may be estimated for each passenger position. The estimated background noise level is then supplied to controller 130 for controlling the amplification of sound output particularly of the processed voice signal in the illustrated implementation. The controller 130 is furthermore supplied with the second error signal ẽ(n). The controller 130 amplifies the second error signal based on the background noise level. For example, if the vehicle is standing and the engine not running, the user may preset a certain amplification, corresponding to a particular volume of reproduced sound. In that situation the background noise level is close to 0, and no further amplification is provided by the controller 130. If the vehicle is now driven at a certain velocity, the engine and the wind and traction noises will cause an increased background noise level. If the background noise level passes certain preset levels, the sound output may be amplified by amplification factors $c_i(n)$, which may be different for different audio channels corresponding to different passenger positions. By way of example, the amplification may be controlled within a range between 0 and 15 dB. The processed voice signal is then combined with the audio signal and put out through the loudspeaker 106. Attention has to be paid that the closed-loop gain does not exceed 1. The amplification may be limited in that case.

It should be clear that FIG. 1 only shows components that are necessary to illustrate an example of an implementation of the system 100. A multimedia system may include many further components that are well-known to a person skilled in the art, such as control elements, display elements, means to receive and demodulate radio signals, CD, DVD, MP3 or other players, communication systems, navigation systems and the like.

Figure 3:
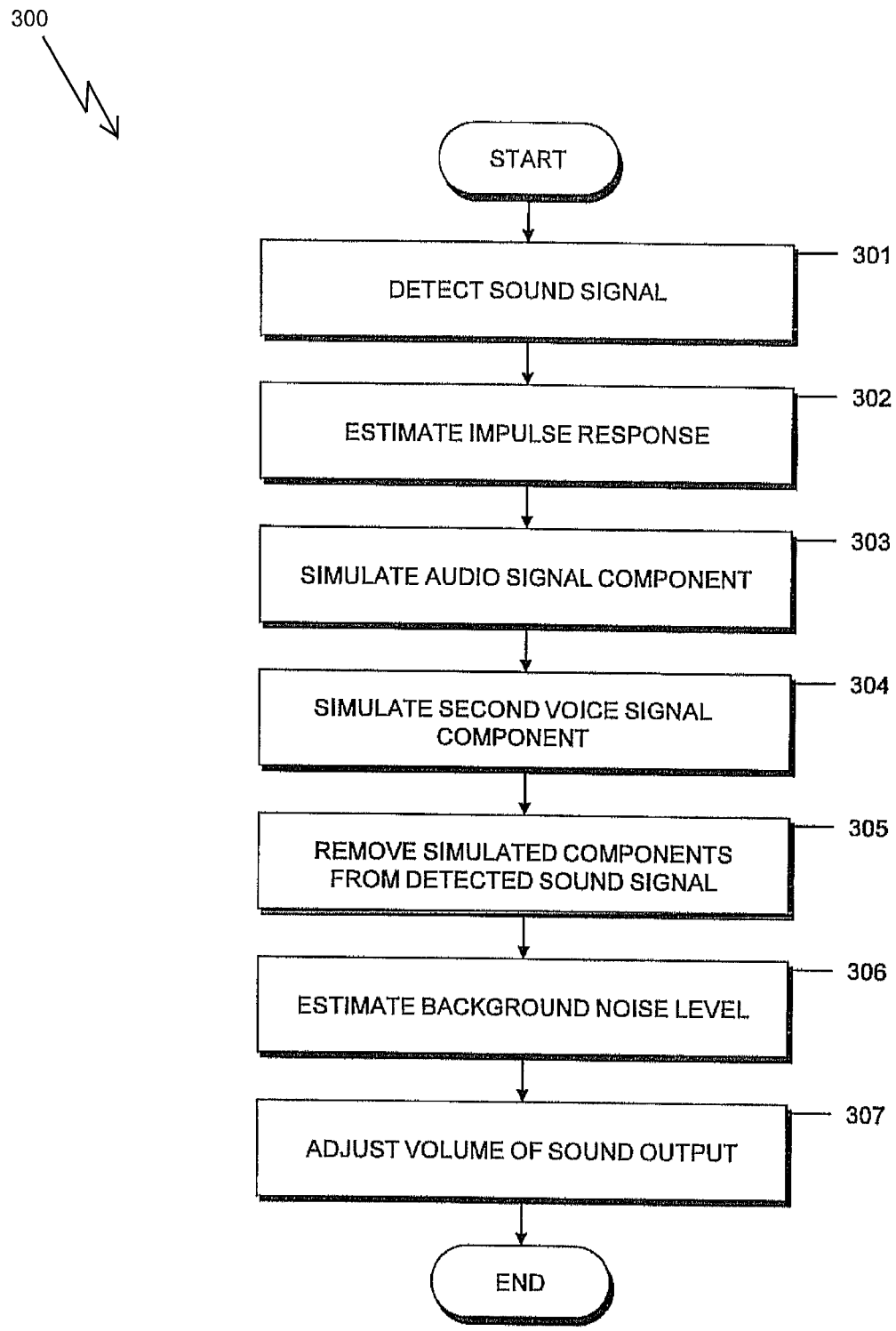
FIG. 3 is a flow diagram of one example of a method for processing sound signals in a vehicle multimedia system.

FIG. 3 shows a flow diagram 300 of one implementation of the method according to the invention. In a first step 301, a sound signal is detected by a microphone. The detected sound signal includes a voice signal component corresponding to a voice signal from a passenger, a second voice signal component corresponding to reproducing a processed voice signal by a loudspeaker and an audio signal component corresponding to an audio signal reproduced by a loudspeaker. In a next step 302, an impulse response between the loudspeaker and the microphone is estimated. If a plurality of audio channels is provided and reproduced by a plurality of loudspeakers, an impulse response is estimated between each loudspeaker and the microphone. Using the estimated impulse response, the audio signal component is simulated in a next step 303. Steps 302 and 303 may be performed in one processing unit, since feedback from the simulated audio signal is provided in order to adapt the estimated impulse response. In a next step 304, the second voice signal component is simulated using the same impulse response that was obtained in step 302. Generally, it is difficult to compensate highly correlated signal components such as voice signal components. The described method, by using the same impulse response, allows for even the correlated second voice signal components to be rather easily removed. In a next step 305, the simulated components are removed from the detected sound signal. The simulated audio signal component may first be subtracted from the detected sound signal to obtain a first error signal, whereafter the simulated second voice signal component is subtracted from the first error signal to obtain an audio- and echo-compensated signal or second error signal $\tilde{e}(n)$. The processing is cycle-based, yet it may also be block-based, where it should be ensured that small block sizes are used to prevent delay. The delay introduced by block-based processing should be below 5-10 ms. Otherwise, the delay between the voice signals emitted by a passenger and the reproduced voice signal will be noticeable by the passenger, which may result in a passenger perceiving the reproduced voice signal as a distracting echo. Particularly, in intercom systems, and karaoke systems this would be a drawback. Therefore, the signal processing is optimized with respect to delay and processing is mainly performed in the time domain. In a next step 306, the background noise level is estimated based on the audio- and echo-compensated signal. The estimated background noise level is then used in the next step 307 to adjust a volume of sound output by the multimedia system. If the background noise level increases, the volume of sound output is also increased so that the passenger is always provided with a well audible sound.

Figure 4:
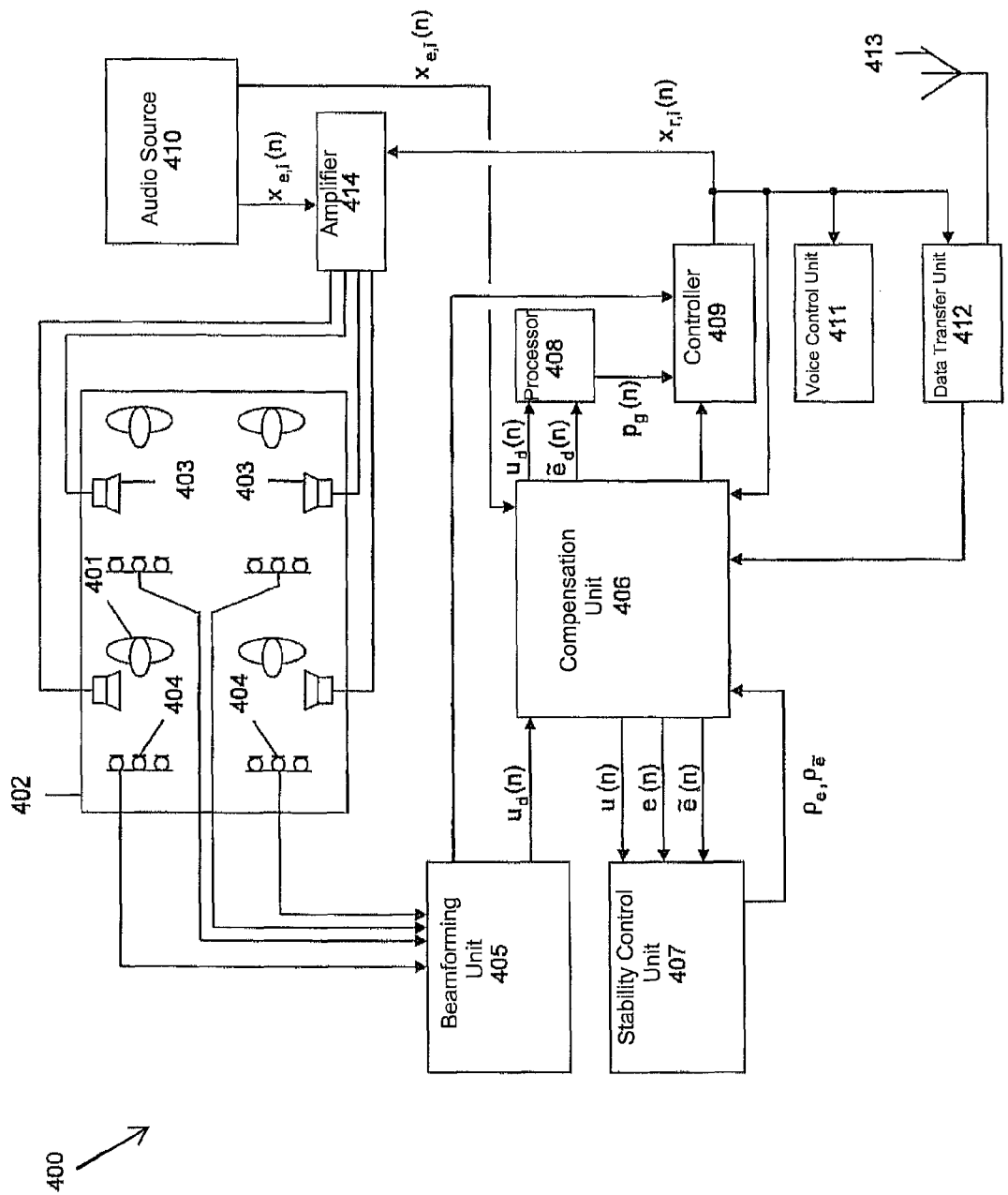
FIG. 4 is a schematic diagram illustrating an alternate implementation of a system for processing sound signals in a vehicle multimedia system.

FIG. 4 shows another implementation of the vehicle multimedia system 400 according to the invention. Multiple passengers 401 are located in a vehicle passenger compartment 402 which comprises multiple loudspeakers 403 and microphones 404. Multiple microphones are provided for each passenger position, so that beam-formed signals can be obtained for each passenger position. Beamforming takes place in a beamforming unit 405, which is supplied with the multiple detected sound signals. The detected sound signals again include first voice signal components, second voice signal components and audio signal components. A directional detected sound signal is obtained for each passenger position by the beamforming unit 405, which may, for example, include a conventional delay and sum beamformer. Alternatively, an adaptive beam former may be utilized, for example, employing a Griffiths-Jim-structure, yet it may be desirable to employ such an adaptive beam former after audio and echo compensation. Several methods of beamforming are known in the art, and several are described in L. J. Griffiths, C. W. Jim: "An Alternative Approach to Linearly Constrained Adaptive Beamforming", IEEE Transactions on Antennas and Propagation, Vol. AP-30, No. 1, pages 24-34, January 1982, the text of both of which is incorporated by reference in this application. By using a beam-formed signal, audio and echo compensation can be further improved. Furthermore, information about an actively speaking passenger can be derived. The directional detected sound signals are then supplied to a compensation unit 406. In the compensation unit 406, impulse responses between the microphone arrays 404 for each passenger position and the loudspeakers 403 associated with different passenger positions and audio channels are estimated. In particular, an impulse response is estimated for each combination of a directional detected sound signal and each audio channel. For that purpose, a plurality of first processing units as described with reference to FIG. 1 are provided in the compensation unit 406, where said first processing units also compensate the audio signal components in the directional detected sound signals.

Furthermore, a plurality of second processing units is provided in the compensation unit 406 for compensating the second voice signal component. The impulse response estimated in the first processing unit is adapted by using feedback, whereby the adaption may become unstable. To avoid that, a stability control unit 407 is provided. The stability control unit 407 uses the directional detected sound signal, the first error signal and the second error signal as an input. Such a stability control unit 407 may of course be provided for each of the first processing unit. In a stability control unit 407, the short-time power of the three input signals is calculated. That can be achieved as previously described using recursive filtering of the squares of the signals:

$$p_e(n) = \lambda p_e(n-1) + (1-\lambda) e^2(n) \tag{15}$$

The time constant $\lambda$ of the IIR-filtering may be chosen from the range $\lambda \in [0.95, 0.99]$. Instability is detected in two stages. In a first step, the short-time power of the directional detected sound signal $p_u(i)$ is compared to the short-time power of the first error signal $p_e(n)$. If $$p_e(n) > K_{p_u}(n) \tag{16}$$

where K is a constant between 1 and 3 dB, the estimated impulse response is weighted with a first factor $0<\rho_e<1$. If the short-time power of the second error signal $p_{\tilde{e}}(n)$ is also larger than the short-time power of the directional detected sound signal $$p_{\tilde{e}}(n) > K p_u(n) \quad (17)$$

the impulse response is weighted with a second factor $\rho_{\tilde{e}}$:

$$0 < \rho_{\tilde{e}} < \rho_e < 1 \quad (18)$$

The damping of the estimated impulse response is stronger in that case, since it is multiplied by two factors smaller than 1. By these measures, an inflation of the estimated impulse response $\hat{h}_t(n)$ is prevented, sufficient damping occurs in only a few cycles.

Similar to FIG. 1 processors 408 for estimating a background noise level are provided in the multimedia system 400. These processors 408 are provided for each passenger position, i.e., each directional detected sound signal. The processors 408 are again provided with the directional detected sound signals and the second error signals. The estimated background noise levels are supplied to controllers 409. The compensation unit 406 may furthermore include signal processing components as described with respect to FIG. 1, and it submits an audio- and echo-compensated signal to the controllers means 409. The compensation unit 406 may combine the audio- and echo-compensated signal of the different passenger positions before submission or it may submit an audio- and echo-compensated signal for each passenger position. The controller means 409 further receives information from the beamforming unit 405, said information relating to speech activity of the passengers. Based on the speech activity of the passengers and the estimated background noise levels the controllers means 409 can control the amplification of the audio- and echo-compensated signals. For each passenger position, a separate amplification factor may be determined based on the estimated background noise level for the respective passenger position. The sound output through the speaker for the respective position is then amplified using the amplification factor. The amplification of the audio signals of different audio channels may be performed independently from the amplification of the processed voice signals based on the estimated background noise levels (not shown). Based on the speech activity information supplied by the beamforming unit 405, the output of the processed voice signal for the speaking passenger may be attenuated. Alternatively, the voice output by the front speakers may be attenuated when a person in the front of the vehicle is speaking, while the voice output of the rear speakers may be attenuated when a person in the rear of the vehicle is speaking. The audio source 410 supplying the audio signal may be a karaoke system. In that case music is played back to the passengers and the singing of the passengers is recorded. After audio and echo compensation, the singing is again played back to the passenger through the loudspeakers 403. In such an application, the compensation may be particularly desirable, since the processed voice signals may be reproduced by the loudspeakers 403 without attenuation. Providing amplification of the audio- and echo-compensated signal based on the estimated background noise level may also be desirable, since it has been shown that if the background noise level increases by 1 dB, a person tends to sing only 0.3 dB louder, so additional amplification is required.

The processed voice signals and the audio signals of the different audio channels are supplied to a power amplifier 414, in which these signals are channelwise combined and power-amplified so that they can be reproduced by the loudspeakers 403. Alternatively, the processed voice signals and the audio signals may be separately amplified and reproduced by separate loudspeakers.

Furthermore, the vehicle multimedia system of FIG. 4 includes a voice control unit 411. The voice control unit 411 utilizes the processed voice signal as an input. That way the identification of a voice command can be enhanced. Recognition of the voice command would be much more difficult if interfering audio signal components or an echo from the voice command would be included in the input signal to the voice control unit. After recognition of the voice command, the voice control unit 411 may perform a function associated with said voice command. The voice control unit 411 may also be directly supplied with the second error signal.

Furthermore, a data transfer unit 412 is provided. The data transfer unit 412 may communicate with another data transfer unit of a similar vehicle multimedia system. The data transfer unit 412 uses the processed voice signal as an input and may transmit data including the processed voice signal to a receiving system. The transmission is wireless, using codecs such as a mobile phone codec, wireless local area network codec or broadband Bluetooth codec. Accordingly, the passengers of the vehicle that have the receiving multimedia system too can listen to the utterances of the passengers 401. Similarly, the data transfer unit 412 may receive data including voice signals from the other vehicle multimedia system. This data is then submitted to the compensation unit 406, where it can be processed, utilized for compensation and given out to the controller 409, where it can be amplified and reproduced using the loudspeakers 403. With this arrangement, the received voice signal is also provided to the compensation unit 406 as a reference signal, since these voice components again have to be compensated from the detected sound signals. By means of the data transfer unit 412, passengers of the two vehicles that comprise the sending and receiving multimedia systems can communicate with each other. If the vehicle multimedia system is used as a karaoke system, the singing of the passengers may be transmitted from one vehicle to the other one. That way passengers of both vehicles can sing together or the passengers of one vehicle may listen to the singing of the passengers of the other vehicle. For this purpose, information relating to the music given out by the karaoke system has to be transmitted between the vehicles. In a situation where a particular song to which the passengers sing is provided in only one vehicle multimedia system, the audio signal from the karaoke system may be provided to the data transfer unit and may be transferred wirelessly to the multimedia system of the other vehicle. If said song is present in both vehicle multimedia systems, only information relating to the song title and the name of the interpreter has to be exchanged together with information relating to timing. Particularly if passengers of both vehicles want to sing together, both songs have to start playing simultaneously. For this application, it is particularly important to minimize delay. Reference numeral 413 denotes an antenna used to receive and send information by the data transfer unit 412.

Figure 5:
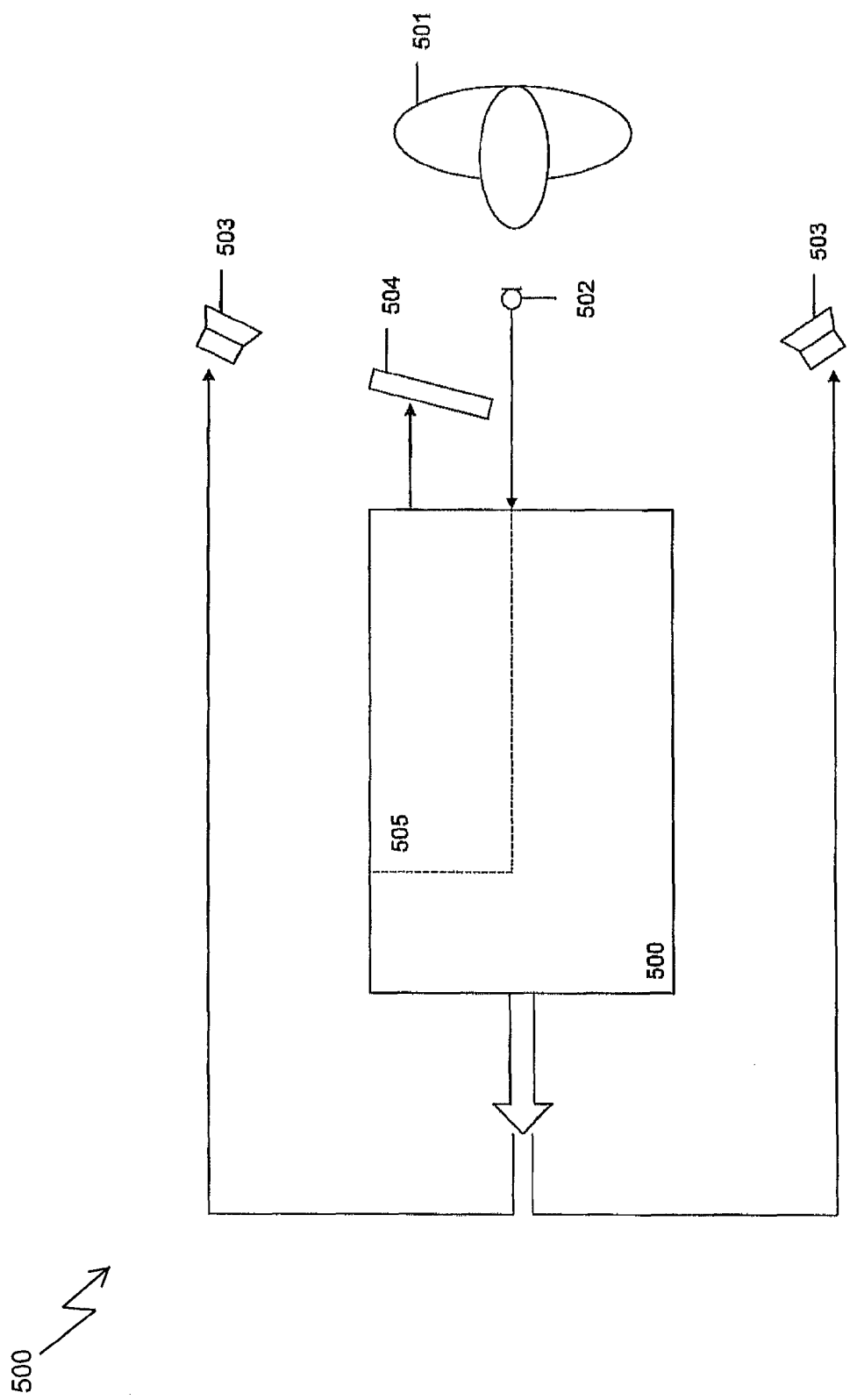
FIG. 5 is a schematic diagram of one example of a karaoke system.

FIG. 5 shows a karaoke system 505 that may be part of the vehicle multimedia system 500. The singing of the passenger 501 is recorded by a microphone 502 and played back via loudspeakers 503. The passenger 501 reads the text of the song which he is singing from the display 504. The display may, for example, be mounted in a headrest or in the dashboard. The karaoke system 505 may include a CD/DVD player for playing back karaoke CDs/DVDs. As such, the karaoke system would give out the music to the song the passenger 501 is presently singing through loudspeakers 503 together with the singing of the passenger. The text to the song is displayed by the karaoke system 505 on the display 504. The karaoke system may further include all the features known from conventional karaoke systems. Multiple microphones may be provided so that multiple passengers may sing simultaneously, or a music video may be shown together with the text of the song on the display 504.

The signal processing means described in this application may be implemented as software on a digital signal processor, may be provided as separate processing chips, which may for example be implemented on a card that can be connected to the multimedia bus system of a vehicle, or may be provided in other forms known to the person skilled in the art.

In summary, the present invention may be implemented in various forms and may include, by way of example, the methods, processes and systems described below. According to one aspect of the invention, a method is provided for processing sound signals in a vehicle multimedia system, the method comprising the steps of detecting, by a microphone, a sound signal in a vehicle, the sound signal including a first voice signal component corresponding to a voice signal from a passenger of the vehicle, and a second voice signal component resulting from reproducing a processed voice signal by means of a loudspeaker, the sound signal further including an audio signal component resulting from reproducing an audio signal of an audio source in the vehicle, estimating an impulse response between a loudspeaker used to reproduce the audio signal and the microphone, simulating a simulated audio signal component based on the impulse response, simulating a simulated second voice signal component based on the impulse response, removing the simulated audio signal component and the simulated second voice signal component from the detected sound signal for obtaining an audio- and echo-compensated signal, estimating a background noise level based on the audio- and echo-compensated signal, and adjusting a volume of sound put out by the vehicle multimedia system based on the estimated background noise level.

According to another implementation, the audio source may for example be a radio, a CD player or a navigation system, which produce audio signals that are reproduced by a loudspeaker in the vehicle passenger compartment. The audio signal may thus be composed of music or the voice of an announcer. If a passenger in the passenger compartment speaks or sings, his voice is recorded by a microphone as a first voice signal component. This signal component may then for example be given out in a vehicle intercom system to the other passengers and accordingly these components are then recorded again by the microphone as second voice signal components. The audio signal component and the second voice signal component may be strongly attenuated in the detected sound signal by removing the simulated audio signal component and the simulated second voice signal component from the detected sound signal. Thus, feedback and echo/reverberation may be reduced or avoided.

According to another implementation, the background noise level can be estimated on the basis of the audio- and echo-compensated signal. In general, the microphone in the passenger compartment records background noise. For example, in the case when music is played back by the vehicle multimedia system and no passenger is speaking, the audio- and echo-compensated signal will mainly contain components from background noise. The volume of sound put out by the vehicle multimedia system is then adjusted based on the estimated background noise level.

According to a further implementation, the volume of the audio- and echo-compensated signal is adjusted, e.g., by amplification, where the processed voice signal is obtained, which is then reproduced by the loudspeaker. Yet amplification and thus volume of the audio signal may also be adjusted, or the volume of a combination of both signals may be adjusted. A well audible sound may then be provided to the passengers of a vehicle, even if the background noise increases during the course of their journey. If the background noise level increases, the volume of the sound output of the multimedia system is also increased, so that the sound is well audible above the background noise. If the background noise level decreases again, for example when the car stops at a traffic light, the volume of sound output is also decreased.

According to a further implementation, this process may occur individually for each passenger, and the volume of sound output may additionally be controlled by the vehicle passengers. With the method according to one implementation of the invention, the vehicle passengers are provided with an echo/reverberation and audio compensated, well audible sound. The audio and echo compensation is relatively simple and does not require extensive processing, whereby little delay is introduced, which may be desirable for vehicle intercom systems and karaoke systems. The method according to this implementation may be capable of compensating reverberation of highly correlated signals, such as recorded voice signals.

According to yet another aspect of the invention, the impulse response is estimated by an adaption process based on the audio signal and the detected sound signal using a gradient method. Since the audio signal is generally not highly correlated and is available as a reference signal, it may be desirable to use it to estimate the impulse response. Since the impulse response inside the passenger compartment between the loudspeaker and the microphone may change, for example due to a movement of the passengers, it may further be desirable to estimate it by an adaption process.

As an example, the simulated audio signal component may be simulated based on the impulse response and the audio signal, where a first error signal is obtained by subtracting the simulated audio signal component from the detected sound signal. The first error signal obtained in that way can then be used for the adaption process for estimating the impulse response. In particular, the simulated audio signal component is obtained by a convolution of the impulse response with the audio signal. The simulated second voice signal component may be simulated based on the impulse response and the processed voice signal, where the audio- and echo-compensated signal is obtained as a second error signal by subtracting the simulated second voice signal component from the first error signal. The processed voice signal may be given out by the loudspeakers of the multimedia system, it is thus recorded by the microphone in form of the second voice signal component. Accordingly, it may be desirable to base the simulation of the simulated second voice signal component on the processed voice signal. Particularly, the simulated second voice signal component may be obtained from a convolution of the processed voice signal and the impulse response. Using the previously determined impulse response, which was based on the audio signal, is not necessary to estimate an impulse response based on a highly correlated voice signal from a passenger. Particularly, if the processed voice signal and the audio signal are reproduced by the same loudspeaker, the impulse response for the audio signal and the processed voice signal may be essentially similar, thus leading to good results for the simulated second voice signal component. After subtracting the simulated second voice signal component from the first error signal, a second error signal is obtained in which the second voice signal component and the audio signal component are essentially compensated.

In another implementation of the invention, the method further includes the steps of determining a short-time power of the detected sound signal, the first error signal and the second error signal, weighting the impulse response with the first weighting factor smaller than 1 if the first error signal short-time power is larger than the detected sound signal short-time power multiplied by a predetermined factor, and weighting the impulse response with the second weighting factor smaller than 1 and smaller than the first weighting factor if the second error signal short-time power is larger than the detected sound signal short-time power multiplied by a predetermined factor. That way the adaptive filtering by means of the estimated impulse response can be stabilized. Since the impulse response is estimated by an adaption process based on the detected sound signal from which the simulated audio signal component has been removed, feedback is provided for the adaption process. In some instances, the adaption of the impulse response may become unstable. This is detected by comparing the short-time power of the first or the second error signal with the short-time power of the detected sound signal multiplied by short-time power of a factor. The factor may for example be between one decibel and three decibel. If the short-time power of the first error signal is larger than the short-time power of the detected sound signal, it can be concluded that the filter adaption has become unstable, since the short-time power of the first error signal should be smaller than the short-time power of the detected sound signal in normal operation. In that case, the estimated impulse response is multiplied by a factor smaller than 1 in order to prevent inflation of the impulse response. In case even the short-time power of the second error signal is larger than the short-time power of the detected sound signal, it can be concluded that even more damping needs to be provided for the impulse response, and it is multiplied by a second weighting factor which is even smaller than the first weighting factor. Accordingly, an inflation of the estimated impulse response may be damped within a few cycles.

According to an implementation, the processed voice signal may be directly obtained from the audio- and echo-compensated signal or after amplification. Yet the audio- and echo-compensated signal or the processed voice signal may be further processed. Processing may comprise filtering the signal using band pass filters or the like to change the frequency characteristics of the signal and to provide a pleasant sound output for the passengers. It may also comprise noise reduction, automatic gain control, limiting the signal level, frequency equalizing and the like.

According to another implementation, the background noise level may be estimated based on a previously detected noise level, a short-time power of the detected sound signal and a short-time power of the audio- and echo-compensated signal. For example, estimating the background noise level comprises the steps of determining a minimum value by taking the smallest value of the following three values: a previously estimated background noise level, a short-time power of the detected sound signal and a short-time power of the audio- and echo-compensated signal, and multiplying the minimum value by a time-dependent factor greater than 1 but smaller than 2. When a short-time power of the audio signal is larger than a predetermined power level, the time-dependent factor is set to a first value and when the short-time power of the audio signal is smaller than said predetermined power level, the time-dependent factor is set to a second value, where the first value is smaller than the second value.

These steps may for example ensure that a background noise level is accurately estimated. In an example, if music is played back inside the passenger compartment, and the background noise level increases inside the vehicle, then the estimated background noise level will increase every cycle since the previously estimated background noise level is multiplied by a factor larger than 1. The estimated background noise level will be increased until it matches the short-time power of the audio- and echo-compensated signal, which essentially corresponds to the recorded background noise. If the background noise drops again, then the audio- and echo-compensated signal will have a lower power than the previously estimated background signal level and the power of the detected sound signal. Accordingly, the new estimated background noise level will drop to the short-time power of the audio- and echo-compensated signal. By these steps, it is ensured that the background noise level is estimated accurately in real time. Using also the short-time power of the detected sound signal has the advantage that in case filter adaptation becomes unstable, leading to an inflation of the impulse response, the estimated background noise level is not inflated. A higher time-dependent factor and thus a faster adaption is chosen when no audio output is present, since an accurate estimation of the background noise level is possible during the many breaks generally present in voice signals.

The adjustment of the volume of the sound put out by the vehicle multimedia system may include the steps of amplifying the audio- and echo-compensated signal by an amplification factor based on the estimated background noise level to obtain the processed voice signal, combining the processed voice signal and the audio signal to a combined signal and reproducing the combined signal by means of a loudspeaker. The processed voice signal and the audio signal or the combined signal may be amplified by a power amplifier before reproduction. If several audio channels are provided, then the audio- and echo-compensated signal may be split before amplification into different channels that are later combined with respective audio channels. Each of the audio- and echo-compensated signal channels may be amplified with an individual amplification factor or with the same amplification factor. For example, the amplification factor is set to 0 dB when the vehicle is stopped and the motor is turned off. When the vehicle is driving, the background noise level increases with increasing velocity, since engine noise and noise from wind and tires increases with increasing velocity.

The estimated background noise level may be constantly compared to predetermined noise levels. If the estimated background noise level exceeds one of these predetermined noise levels, the amplification factor is slowly increased to a new value. For example, the amplification factor is between 0 and 15 dB. Alternatively, the audio signal may also be amplified before combination, so that the relative power of the two signals can be determined. That may be desirable in situations where one wishes to reduce the volume of the audio output while maintaining the volume of the processed voice signal, whereby the comprehensibility in for example a vehicle intercom system may be enhanced.

In another implementation of the invention, a plurality of microphones and a beamforming unit is provided. A plurality of sound signals is detected and the sound signals are processed using the beamforming unit to provide directional detected sound signals. Such a directional detected sound signal may be obtained for each passenger position, where multiple microphones may be provided for each passenger position. Background noise and signal components other than the sound originating from a predetermined direction, preferably the direction of the vehicle passenger, may be attenuated. Accordingly, the quality of the sound output of the vehicle multimedia system can be improved. Methods for obtaining a directional detected sound signal from a plurality of detected sound signals by beamforming algorithms is described in detail in L. J. Griffiths, C. W. Jim: "An Alternative Approach to Linearly Constrained Adaptive Beamforming", IEEE Transactions on Antennas and Propagation, Vol. AP-30, No. 1, pages 24-34, January 1982 (document D1) which is incorporated herein by reference in its entirety. Generally, the different detected sound signals are combined by digital filters in such a way that sound originating from a preferred direction is not attenuated, whereas sound originating from other directions is strongly attenuated. Furthermore, the beamforming unit may include a blocking beam former that attenuates the sound originating from the preferred direction, whereas it does not attenuate sound originating from the other direction. By comparing the signal produced by such a blocking beam former with the direction detected sound signal, it can be determined whether a passenger is speaking and which passenger is speaking. If no passenger is speaking, both should have substantially similar short-time powers. If the short-time power of the directional detected sound signal is larger than the short-time power of the sound from the blocking beam former then the passenger associated with the directional detected sound signal is speaking, whereas if it is smaller then another passenger is speaking. Besides improving the sound quality of the detected signal, the beamforming unit can determine which passenger is speaking or in the case of a karaoke system singing.

In another implementation, the removing of the simulated audio signal component and the simulated second voice signal component is performed before the processing of the detected sound signal for beamforming, and the processing of the detected sound signal for beamforming comprises the step of filtering the sound signal using adaptive filters. By an adaption of the beam former the directivity of the beam former can be further increased. To achieve that, a structure such as the "Griffiths Jim structure", described in D1, can be used. The beam formers can be adapted so that essentially no sound is recorded from the direction of the loudspeakers. The filters may then be adapted when no signal is detected from the preferred direction.

According to another implementation, a background noise level is estimated for each passenger position and the volume of the sound put out by the vehicle multimedia system is individually adjusted for each passenger position, based on the respective estimated background noise level. For example, at least one loudspeaker and at least one microphone are provided for each of at least two vehicle passenger positions, where for each position a background noise level is estimated based on the directional detected sound signal for the respective position, an amplification factor is determined based on the estimated background noise level for the respective position, the audio- and echo-compensated signal is amplified using the amplification factors for the respective position and the combined signal is reproduced using the at least one loudspeaker of the respective position. The background noise level may for example be estimated after beamforming. A background noise level can be estimated for each passenger position. The volume of sound put out by the vehicle multimedia system can then be individually adjusted for each passenger position based on the respective estimated background noise level. If different background noise levels exist for different passenger positions, a well audible sound output may be provided for each passenger position.

Furthermore, a passenger position may be determined from which the first voice signal components originate and the volume of sound output of a loudspeaker may be attenuated for said passenger position. This can be particularly useful for vehicle intercom systems, where it is not desired to reproduce the voice of the speaking passenger next to the speaking passenger. The position of the passenger from which the first voice signal components originate may be determined by using the beamforming unit. For a loudspeaker associated with that passenger position the output volume of the processed voice signal or the audio signal or both may be attenuated which may avoid a speaking passenger hearing his own voice with a loud volume.

According to another aspect of the invention, the multimedia system includes a karaoke system. According to an implementation, the first voice signal component includes a sound signal created by a singing passenger, and the audio signal originates from a karaoke source. A karaoke system inside a vehicle can provide entertainment for passengers, which is particularly useful for long journeys. The karaoke system may include a display for displaying information relating to the audio signal, i.e., the text of a song, and an audio playback device such as a CD player which may be configured to play back a karaoke disk comprising music and song text information, e.g., in the CD-G-format. The played back music generally does not include the voice of a singer and the text information is displayed on the display while the music is played back. The passenger can then read the text from the display and sing along with the music which is put out by the vehicle multimedia system. The singing is recorded and then played back via the loudspeakers of the vehicle multimedia system. For such an application, the processing of the detected sound signal for removing the audio signal component and the second voice signal component is particularly useful, since reverberation and feedback would strongly decrease the ability to enjoy such a system. In one implementation, the music output of the karaoke system corresponds to the audio signal that is used as a reference to adapt the estimated impulse response. The first voice signal components may then correspond to the voice of a singing passenger, whereas the second voice signal components may correspond to this voice being reproduced by the loudspeakers in the vehicle.

According to a further aspect of the invention, at least one function of the multimedia system or the vehicle can be voice-controlled, where the processed voice signal is utilized to control that function. Voice control in general is known in the art. A command spoken by a passenger has to be recognized by a voice control unit, and the function corresponding to the command has to be executed. To use the processed voice signal which has been audio- and echo-compensated, may be desirable, since recognition of the command is facilitated due to the absence of interfering signal components. In such a system, the success rate of recognizing the voice command can be increased.

In another implementation, the multimedia system may further include a communication system such as a telephone system or a vehicle interior communication system using the processed voice signals as an input. Since the processed voice signal contains essentially only first voice signal components, to use this signal as an input for telephone systems may be desirable, since the person communicating with the vehicle passenger through said telephone system only receives the first voice signal component. Thereby, a clear voice signal may be provided to the receiving person. Also, the option may be provided that several vehicle passengers participate in the telephone conversation. To that end the utterance of one vehicle passenger may be given out through the multimedia system to the other vehicle passengers. Even so, with the method of the present implementation, these second voice signal components, which are again recorded by the microphone, do not lead to feedback or reverberation, since they are compensated.

According to a further implementation, the method may include the step of transferring data between the multimedia system and a multimedia system of a substantially similar kind, where the transferred data comprises at least the processed voice signal and where the data transfer is wireless. Similarly, a processed voice signal may be received by the multimedia system, where the received processed voice signal was sent by the multimedia system of another vehicle. If the multimedia system is used as an intercom system, conversation between passengers of different vehicles becomes possible. That way, passengers of one vehicle can communication with passengers of another vehicle without the need for a telephone system. If the multimedia system is used as a karaoke system, transferring data comprising at least the processed voice signal has the advantage that the passengers of the other vehicle that has a multimedia system capable of receiving the data can listen to the singing of the passengers of the first vehicle. For example, the transferred data further comprises data relating to the audio signal or the audio signal itself. That means that in a karaoke system the voice of the singing passenger is transferred together with the music given out by the karaoke system. Accordingly, the passengers of the other vehicle can listen to the singing and the music without the need to have the same music available in their vehicle. For example, a stereo signal is transmitted to ensure good music quality. Alternatively, data relating to the audio signal is transmitted together with the processed voice signal. The data related to the audio signal may include the interpreter of the song and the song title, or other information that enables the identification of the particular song. If the song is supposed to be played back in the other vehicle together with the transmitted processed voice signal, the multimedia system of the other vehicle must have that song available. Accordingly, only a limited amount of data has to be transferred, while a high sound quality is provided in both vehicles. Such systems may further exchange information relating to timing. Due to the processing and the transmission of the processed voice signal, a delay may be introduced. This delay would have to be compensated by the receiving multimedia system, so that the reproduced audio signal and the reproduced processed voice signal have the right timing. For transmission, a mobile phone codec, wireless local area networks codec or broadband Bluetooth codec may be used. With the latter, the two vehicles sending and receiving the signal may have only a limited distance from each other. Nevertheless, a higher transmission bandwidth is possible in that case.

Furthermore, a system for processing sound signals in a vehicle multimedia system is provided, comprising at least one loudspeaker for reproducing an audio signal of an audio source and for reproducing a processed voice signal, at least one microphone for detecting a sound signal comprising a first voice signal component corresponding to a voice signal from a passenger of the vehicle, a second voice signal component corresponding to the reproduced processed voice signal, and an audio signal component corresponding to the reproduced audio signal, means for estimating an impulse response between the loudspeakers used to reproduce the audio signal and the microphone, first processing unit formed to compensate the audio signal component in the detected sound signal where a first error signal is obtained, comprising a first filter using the impulse response as filter coefficients, second processing unit formed to compensate the second voice signal component in the detected sound signal where a second error signal is obtained, comprising a second filter using the same impulse response as filter coefficients.

According to an implementation, the system may further include a processor for estimating the background noise level based on the second error signal, and controller means for controlling amplification of the second error signal based on the background noise level. With such a system, an audio- and echo-compensated signal with the proper volume may be provided to the vehicle passenger. Such a system achieves good echo compensation even for highly correlated voice signals. The system can give out well audible sounds to the passengers of a vehicle even if the background noise in the passenger compartment changes.

As an example only, the audio source may be multichannel, such as a stereo or Dolby surround audio source. Multiple loudspeakers and multiple microphones may be provided, and these loudspeakers and microphones may be associated with vehicle passenger positions. The system may further include signal processing components for processing the detected sound signal after filtering. The system may further include a plurality of microphones and a beamforming unit for processing the sound signals detected by said microphones for generating a directional detected sound signal. If several microphones are provided for each passenger position, several directional detected sound signals may be generated, each associated with a particular passenger position. Directional detected sound signals are desirable for use in that interfering sound signal components originating from other directions than a preferred direction, preferably the direction of the speaker, are strongly attenuated. The system may further include decorrelation filters for filtering the detected sound signal and the audio signal. Using decorrelation filters is desirable because the convergence of the filter adaption is sped up. Filtering may occur in the frequency domain, but filtering may also occur in the time domain to avoid delay. Alternatively, processing may occur in the sub-band domain.

According to an implementation, the system may further comprise a stability control unit weighting the impulse response based on a predetermined criterion. Such a criterion may be whether the short-time power of the first error signal is larger than the short-time power of the detected sound signal or whether the short-time power of the second error signal is larger than the short-time power of the detected sound signal or a combination thereof. The impulse response may be weighted with a factor smaller than 1 but larger than 0. If the system runs stably, the short-time power of the first error signal should be smaller than the short-time power of the detected sound signal, since the audio signal component has been compensated in the first error signal. In the case of a larger first error signal short-time power the system runs unstable, and the impulse response is weighted with a factor smaller than 1, whereby a damping is provided for the impulse response adaption, preventing an inflation of the impulse response and restoring the stability of the system.

According to an implementation, the controllers for controlling the amplification are formed for independently controlling sound volume for different passenger positions inside the vehicle, the amplification being based on the voice activity of a passenger on the respective position and/or the background noise present at the respective position. The output of the processed voice signal and the audio signal may be independently controlled, or it may be controlled together. By this feature, a pleasant sound output is generated for each passenger, since at each passenger position different background noise may prevail. Furthermore, if voice activity of the passenger is detected, the output of the processed voice signal can be attenuated for the passenger position, whereby it is avoided that the passenger has to listen to his voice with a high volume, which would be highly distracting.

According to another aspect, the system may further include a karaoke system. Karaoke systems are well-known in the art. They generally comprise a display for displaying the text of the song, and means for playing back the song. The song and the text may for example be stored on a CD or a DVD. The song played back by the karaoke system generally only comprises the music without the singing of the artist. The music together with the singing of the passenger that was detected by the microphone and processed to remove reverberation and the audio components may then be played back by the vehicle multimedia system. The system may further include a voice control unit for voice-controlling at least one function of the multimedia system or the vehicle based on the processed voice signal. Thereby, recognition of the voice command spoken by a passenger is facilitated, since interfering signal components are removed by processing the detected sound signal. The system may further include a data transfer unit for transferring data comprising the processed voice signal to a vehicle multimedia system capable of receiving said data. This way, intervehicle communication is enabled and intervehicle karaoke sessions become possible. The multimedia system may furthermore be formed as to perform the steps of one of the above-described methods.

The above-described features and aspects of the invention may be combined to form new implementations, which lie within the scope of the present invention.

It will be understood, and is appreciated by persons skilled in the art, that one or more processes, sub-processes, or process steps described in connection with FIGS. 1-5 may be performed by hardware and/or software. If the process is performed by software, the software may reside in software memory (not shown) in a suitable electronic processing component or system such as, one or more of the functional components or modules schematically depicted in FIGS. 1-5. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. Method for processing sound signals in a vehicle multimedia system, comprising:
   detecting a sound signal with a microphone, where the sound signal has a first voice signal component that corresponds to a voice signal, a second voice signal component that results from a loudspeaker, and an audio signal component resulting from an audio signal;
   estimating an impulse response between the loudspeaker and the microphone in an adaptive echo cancellation filter;
   computing a simulated audio signal component with the impulse response in the adaptive echo cancellation filter;
   computing a simulated second voice signal component based on the impulse response determined by the adaptive echo cancellation filter in a feedback filter, wherein the same impulse response is used for computing the simulated audio component and for computing the simulated second voice signal;
   removing the simulated audio signal component and simulated second voice signal component from the detected sound signal that results in a compensated signal;
   estimating a background noise level based on the compensated signal; and
   adjusting a sound output volume by the vehicle multimedia system based on the estimated background noise level.

2. The method of claim 1, where estimating the impulse response includes employing a gradient approach.

3. The method of claim 1, further including processing the compensated signal.

4. The method of claim 1, where estimating the background noise level further includes, estimating the background noise level with a previously detected background noise level, a short-time power of the detected sound signal and a short-time power of the audio- and echo-compensated signal.

5. The method of claim 1, where estimating of the background noise level includes: determining a minimum value from a previously estimated background noise level, a short-time power of the detected sound signal and a short-time power of the compensated signal; and multiplying the minimum value by a time-dependent factor greater than one but smaller than two.

6. The method of claim 5, further including: setting the time-dependent factor to a first value when the short time power of the audio signal is larger than a predetermined power level, and setting the time-dependent factor to a second value when the short-time power of the audio signal is smaller than said predetermined power level.

7. The method of claim 1, where the adjustment of the volume of the sound output by the vehicle multimedia system includes: amplifying the compensated signal by an amplification factor based on the estimated background noise level to obtain the processed voice signal; combining the processed voice signal and the audio signal to a combined signal; and reproducing the combined signal by means of the loudspeaker.

8. The method of claim 1, further including: detecting with a plurality of microphones, and a beamforming unit a plurality of sound signals; and processing the sound signals using the beamforming unit that results in directional detected sound signals.

9. The method of claim 8, where removing of the simulated audio signal component and the simulated second voice signal component is performed before the processing of the detected sound signals for beamforming, and processing of the detected sound signals for beamforming further includes filtering the sound signals using adaptive filters.

10. The method of claim 8, further including, estimating a background noise level based on the directional detected sound signal for a respective position, where at least one loudspeaker and at least one microphone is provided at each of the respective positions, amplifying the compensated sound signal with an amplification factor for the respective position, and reproducing a sound signal using the at least one loudspeaker of the respective position.

11. The method of claim 1, where estimating a background noise level includes, estimating the background noise level for a passenger position and the volume of the sound output, and individually adjusting the sound output for the passenger position, based on the respective estimated background noise level.

12. The method of claim 1, further including: determining a passenger position from which the first voice signal components originate; and attenuating the volume of sound output of a loudspeaker associated with the passenger position.

13. The method of claim 1, where the multimedia system is a karaoke system, where the first voice signal component comprises a sound signal created by a singing passenger, and where the audio signal originates from a karaoke source.

14. The method of claim 1, further including, controlling at least one function of the multimedia system by voice.

15. The method of claim 1, where the multimedia system is a communication system.

16. The method of claim 1, further including transferring data between the multimedia system and another multimedia system.

17. The method of claim 16, where transferring data further includes transferring data associated with the audio signal.

18. A system for sound signal processing in a vehicle multimedia system, comprising:
at least one loudspeaker that is able to reproduce an audio signal from an audio source and a processed voice signal;
at least one microphone for detection of a sound signal, where the sound signal includes a first voice signal component that corresponds to a voice signal, a second voice signal component that corresponds to the reproduced processed voice signal, and an audio signal component corresponding to the reproduced audio signal;
an estimator that estimates an impulse response between the loudspeaker used to reproduce the audio signal and the microphone;
a first processing unit that compensates for the audio signal component in the detected sound signal where a first error signal is obtained with a first filter using the impulse response as filter coefficients;
a second processing unit that compensates for the second voice signal component in the detected sound signal where a second error signal is obtained with a second filter, wherein the some impulse response is used for compensating for the audio signal component and for compensating for the second voice signal component;
a processor that estimates a background noise level based on the second error signal;
a controller that controls the amplification of the second error signal based on the background noise level.

19. The system of claim 18, includes a signal processor that processes the detected sound signal after filtering.

20. The system of claim 18, includes a plurality of microphones, and a beamforming unit that processes the sound signals detected by the plurality of microphones and generates a directional detected sound signal.

21. The system of claim 18, includes de-correlation filters that filter the detected sound signal and the audio signal.

22. The system of claim 18, further comprising a stability control unit for weighting the impulse response based on a predetermined criterion.

23. The system of claim 18, where the controller that controls the amplification associated with each passenger position and independently controls sound volume for each passenger positions.

24. The system of claim 18, where the multimedia system is a karaoke system.

25. The system of claim 18, further includes a data transfer unit that transfers data which includes the processed voice signal to a vehicle multimedia system.

26. The system of claim 18, further includes a voice control unit to control at least one function of the multimedia system.

27. The method of claim 1, where simulating the simulated audio signal component includes obtaining a first error signal by subtracting the simulated audio signal component from the detected sound signal.

28. The method of claim 27, where simulating the simulated second voice signal component further includes obtaining a second error signal by subtracting the simulated second voice signal component from the first error signal.

29. The method of claim 28, further includes,
determining a short-time power of the detected sound signal, the first error signal and the second error signal;
weighting the impulse response with a first weighting factor smaller than one if the first error signal short-time power is larger than the detected sound signal short-time power multiplied by a predetermined factor; and
weighting the impulse response with a second weighting factor smaller than one and smaller than the first weighting factor if the second error signal short-time power is larger than the detected sound signal short-time power multiplied by a predetermined factor.

30. The system of claim 18, further comprising:
a stability control unit for determining the short-time power of the first and second error signals and weighting the impulse response based at least on the short-time power of the first error signal and the short-time power of the second error signal.

* * * * *